(12) United States Patent
Kawasaki

(10) Patent No.: US 7,596,367 B2
(45) Date of Patent: Sep. 29, 2009

(54) SYSTEM AND METHOD FOR STANDBY MODE IN DIRECTIONAL SIGNAL RECEIVER

(75) Inventor: Kenichi Kawasaki, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 598 days.

(21) Appl. No.: 11/054,468

(22) Filed: Feb. 9, 2005

(65) Prior Publication Data

US 2006/0178127 A1    Aug. 10, 2006

(51) Int. Cl.
*H04B 1/16* (2006.01)
(52) U.S. Cl. .................... 455/343.2; 455/574
(58) Field of Classification Search ........... 455/343.1, 455/343.2, 343.5, 572, 574
See application file for complete search history.

(56) References Cited

U.S. PATENT DOCUMENTS

| | | | | |
|---|---|---|---|---|
| 4,356,568 A | * | 10/1982 | Ogita et al. | 455/212 |
| 4,392,254 A | * | 7/1983 | Ecklund | 455/173.1 |
| 5,381,444 A | * | 1/1995 | Tajima | 375/141 |
| 5,525,993 A | * | 6/1996 | Pobanz et al. | 342/51 |
| 5,613,235 A | * | 3/1997 | Kivari et al. | 455/574 |
| 5,815,298 A | * | 9/1998 | Cern | 398/16 |
| 5,852,770 A | * | 12/1998 | Kasamatsu | 455/126 |
| 6,084,483 A | * | 7/2000 | Keshtbod | 331/57 |
| 6,226,276 B1 | * | 5/2001 | Na | 370/294 |
| 6,549,429 B2 | * | 4/2003 | Konno | 363/21.04 |
| 6,668,165 B1 | * | 12/2003 | Cloutier | 455/336 |
| 6,696,983 B2 | * | 2/2004 | Tang et al. | 340/989 |
| 6,707,858 B1 | * | 3/2004 | Davie | 375/316 |
| 7,123,940 B1 | * | 10/2006 | Rausch et al. | 455/562.1 |
| 2004/0097210 A1 | * | 5/2004 | Sato | 455/260 |
| 2005/0151599 A1 | * | 7/2005 | Ido et al. | 333/133 |
| 2005/0176416 A1 | * | 8/2005 | Desch et al. | 455/422.1 |
| 2005/0176462 A1 | * | 8/2005 | Kawasaki | 455/552.1 |
| 2005/0264306 A1 | * | 12/2005 | Jung et al. | 324/717 |
| 2006/0160489 A1 | * | 7/2006 | Hardacker | 455/66.1 |

* cited by examiner

*Primary Examiner*—Nhan T Le
(74) *Attorney, Agent, or Firm*—John L. Rogitz

(57) ABSTRACT

A wireless receiver of a directional signal such as a 60 GHz signal can have a low power standby mode in which the linear oscillator (radio) portion of the receiver is deenergized. A DC detect circuit can detect the DC portion of an incoming signal, at which time the DC detect circuit energizes the remaining portions of the receiver.

7 Claims, 2 Drawing Sheets system receiver/transceiver example switch

SYSTEM AND METHOD FOR STANDBY MODE IN DIRECTIONAL SIGNAL RECEIVER

I. FIELD OF THE INVENTION

The present invention relates generally to power conservation in receivers and more particularly to power conservation in wireless receivers of directional signals.

II. BACKGROUND

Receivers such as but not limited to battery-powered wireless content receivers in TVs, cameras, other hand held devices, and audio/video servers, which devices may include processors executing an operating system such as Windows CE®, can consume power to the point that the device battery can be quickly drained. Even wired devices should conserve power for energy conservation purposes. Accordingly, the present invention recognizes a need for power conservation.

The present invention further critically recognizes that the above need may be particularly acute in higher frequency wireless receivers such as 60 GHz receivers that operate in the wireless spectrum between 57 GHz and 64 GHz (hereinafter "60 GHz band"), which is unlicensed by the U.S. Federal Communications Commission to give organizations the opportunity, unfettered by excessive regulations, to use this spectrum for implementing wireless local area networks (LANs). The wireless LANs, in turn, can be used in a large number of applications owing to the characteristics of the 60 GHz spectrum, which include short range, high directivity (and, hence, inherent security), and large data bandwidth. Excessive power may be required, however, to permit the use of high frequencies.

Regardless of the application, the present invention makes the additional critical observations. A receiver that is not actively receiving may enter a lower power standby mode, in which some of the receiver's circuitry is deactivated to conserve power. When it is time for the receiver to process signals as indicated by the transmission of a pilot "control signal" from a sender, the receiver enters a full power mode. As understood herein, however, heretofore significant portions of the receiver circuitry have been required to remain energized in the standby mode to process directionless AC control signals to reconfigure the receiver to the full power mode, detracting from the utility of the standby mode. The AC control signals have been required to avoid unintentionally powering up other nearby quiescent receivers, which might otherwise detect a directionless control signal and leave the standby mode despite the fact that no incoming signal is intended for the receiver. Having made the observations above, the invention herein is provided.

SUMMARY OF THE INVENTION

A wireless receiver is configured to receive a directional signal. The receiver has a standby mode in which at least an oscillator of the receiver is deenergized, and a DC detect circuit detects an incoming directional signal. The DC detect circuit causes the oscillator of the receiver to be energized.

The receiver may be a 60 GHz receiver and the DC detect circuit can include a rectifying element. The DC detect circuit can also include a low pass filter, a comparator, and a controller that controls a switch to selectively energize the oscillator. Specifically, in the presence of an incoming directional signal producing a DC signal of sufficient magnitude, the controller causes the oscillator to be energized and the incoming directional signal to be sent to the oscillator.

In another aspect, a receiver includes an AC signal receiver and means for deriving, from an incoming directional AC signal, a DC signal. The receiver also includes means for causing the AC signal receiver to be energized when the DC signal satisfies a threshold.

In still another aspect, a method for conserving power in a receiver includes receiving a directional AC signal and deriving a DC signal from the AC signal. If the DC signal satisfies at least one criterion, an AC signal receiver is energized and the AC signal is sent thereto. Otherwise, the AC signal receiver is maintained in a standby state in which at least portions of the receiver are deenergized.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

The Figures show non-limiting implementations of present principles, it being understood that variations from the embodiments shown may be used. By way of non-limiting examples, the present alternating current (AC) receiver may be a receiver or transceiver, it may be a 60 GHz receiver or it may be an infrared or optical signal receiver, it may be wired or wireless and thus it may be powered by a battery or by the electrical grid, and the below-described DC signal processing portions may be established by discrete components as shown in FIG. 2 or the functions of the components may be entirely or partially established in software on a digital signal processor or other processor in conjunction with appropriate analog-to-digital conversion circuitry.

Figure 1:
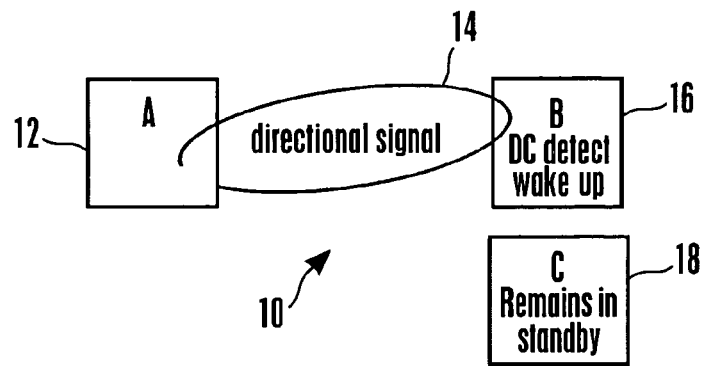
FIG. 1 is a simplified diagram of the present system.

Referring initially to FIG. 1, a system is shown, generally designated 10, in which at least one transmitter 12 (labelled "A" in FIG. 1) sends a wireless directional AC signal 14 to a first transceiver or receiver 16 (labelled "B") which operates in accordance with disclosure below to detect the signal and wake up its AC signal processing portion, i.e., to energize its AC signal processing portion from a standby state in which the AC signal processing portion is deenergized. As illustrated in FIG. 1 it is possible that a second receiver or transceiver 18, labelled "C", does not receive the directional signal and hence remains in the standby state, conserving power. The receivers or transceivers "B" and "C" may be implemented in TVs, cameras, other hand held devices, audio/video servers, which devices may include processors executing an operating system such as Windows CE®, or other devices such as wireless telephones.

Figure 2:
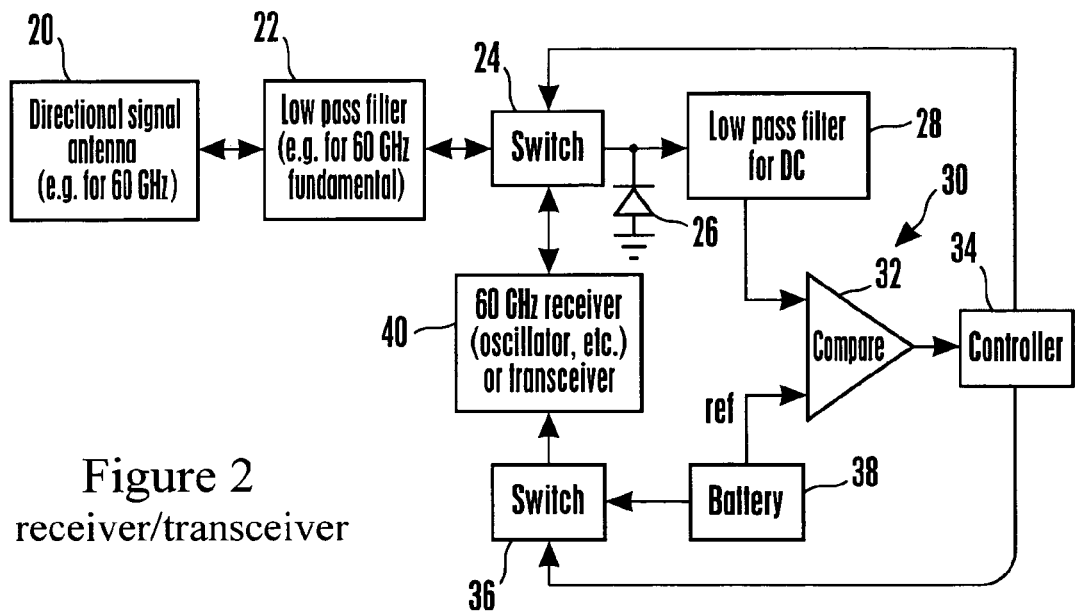
FIG. 2 is a block diagram of a non-limiting receiver or transceiver according to the present invention.

FIG. 2 shows that in one implementation, the receiver or transceiver of the present invention may include at least one directional AC signal antenna 20, e.g., a 60 GHz antenna. The signal from the antenna 20 can be sent if desired to a first low pass filter 22, which reflects back to the below-discussed diode higher-order harmonics that might be generated by the diode, thereby improving DC conversion efficiency and eliminating unwanted higher-order signals radiated from the antenna. From the first low pass filter 22, the signal is sent to a signal switch 24, which in one configuration sends the signal on to a rectifier 26 that can include, e.g., a rectifier diode between the signal switch 24 and ground as shown. A Schottky detector that can operate at 60 GHz can be used in non-limiting implementations.

The rectifier 26 rectifies the signal and can send it to a second low pass filter 28 for direct current (DC) filtering. The second low pass filter 28 may be, e.g., an inductor-like device. In any case, once the signal has essentially been converted to DC, i.e., once a DC signal has been derived from the incoming AC signal, it is sent to a DC detector circuit 30. In one non-limiting embodiment, the DC detection circuit 30 includes a comparator 32 and a controller 34 that may be implemented as a processor. The controller 34 may control the signal switch 24 and a power switch 36 in accordance with logic below. The power switch 36 selectively connects a power source such as a battery 38 to an AC signal receiver 40 that may be, e.g., a 60 GHz receiver. Being an AC signal receiver, the receiver 40 may include components such as a linear oscillator for down conversion that consumes relatively high power, particularly at higher frequencies such as 60 GHz. The battery 38 may send a voltage reference signal to the comparator 32 for purposes to be shortly disclosed.

In some implementations, the first low pass filter 22 may be integrated with the antenna 20. Various amplifiers may also be used, e.g., between the antenna 20 and first low pass filter 22. In non-limiting embodiments, to avoid interference from low frequency signals, the antenna 20 can have high pass filter characteristics achieved with, e.g., a patch, slot, or waveguide antenna. Or, the first low pass filter 22 may be replaced by a bandpass filter to pass the fundamental frequency sought to be passed.

In any case, having set forth the non-limiting components of FIG. 2, it may now be appreciated that in the absence of an incoming signal, the controller 34 maintains the AC signal receiver (or at least the high power consuming portions of it, such as the oscillator) in a standby state, wherein the AC signal receiver 40 is deenergized. This can be achieved in some implementations by use of the power switch 36 to disconnect the battery 38 from the AC signal receiver 40. Further, it may be desired not to send the AC signal to the AC signal receiver while in standby mode, in which case the signal switch 24 is provided and controlled by the controller 34 to connect the antenna 20 (and/or first low pass filter 22) only to the DC signal processing portion of the device, and to not connect any AC signals to the AC signal receiver 40.

In contrast, when a directional AC signal is received while in the standby mode, the signal is converted to DC as discussed above, and if it satisfies a threshold, the controller 34 reconfigures the switches 24, 36 to energize the AC signal receiver 40 from the battery 38 and to send the AC signal to the AC signal receiver 40 for processing. Further to this end, the comparator 32 may compare the voltage of the DC signal to the reference voltage and send a control signal to the controller 34 to cause it to reconfigure the switches 24, 36 in the event that the DC voltage exceeds the reference voltage.

As added features, the transmitter 12 shown in FIG. 1 may transmit relatively high power signals until such time as an intended transceiver sends back an acknowledgement that it has detected the signal as described above and has entered the wake-up mode (i.e., has energized its AC signal receiver), at which time the transmitter can reduce its transmission power. In addition, if desired the transmitter 12 can initially transmit a predetermined on/off pattern identifying the transmitter and/or intended receiver, and the receiver enters the wake-up mode only when the pattern is detected. In such an implementation, the receiver may include, after the comparator 32, a counter and/or timer to count DC pulses and to time the intervals between them and, thus, to detect the on/off pattern as received. A second controller (not shown) may be provided for receiving the detected pattern and determining whether the transmitter is an authorized transmitter and/or whether the receiver is authorized to receive the transmission. In this way, if an unauthorized or mistakenly aimed directional beam is detected, unintended reconfigurations from the standby mode to the wake-up mode are avoided.

It is to be understood that when the device shown in FIG. 2 is a receiver only, the arrows between the elements 20 and 22 and 22 and 24 point only to the right and the arrow between the elements 24 and 40 points only down, whereas when the device is a transceiver, all three of the above arrows are double, as shown in FIG. 2.

Figure 3:
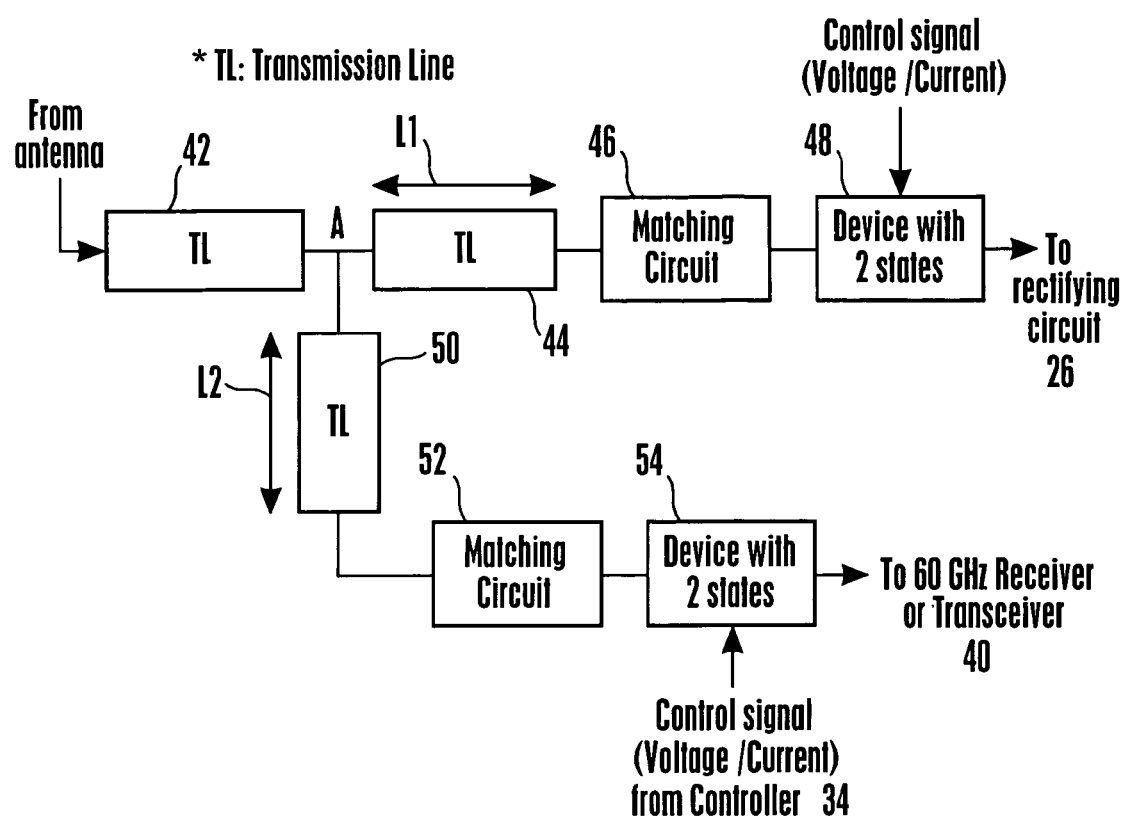
FIG. 3 is a block diagram of a non-limiting switch that can be used in the present invention.

The switches disclosed above may be simple electro-mechanical switches or contacts that can be operated by relays. Or, the switches may be implemented by other toggling devices. For example and without limitation, FIG. 3 shows that a switch such as the signal switch 24 of the present invention may be implemented by a switch system that includes main transmission line 42 connected to a transmission line 44, which in turn is connected to a matching circuit 46. The matching circuit 46 can be connected to a first two-state device 48 such as but not limited to a diode, field effect transistor, or other transistor. The first two-state device 48 is connected to the rectifier 26 as shown.

In the non-limiting embodiment shown in FIG. 3, the main transmission line 42 is also connected to an AC signal transmission line 50, which in turn is connected to an AC line matching circuit 52. The matching circuit 52 can be connected to a second two-state device 54 such as but not limited to a diode, field effect transistor, or other transistor. The second two-state device 54 is connected to the AC signal receiver 40 as shown. As also shown, the controller 34 sends control signals to the two-state devices 48, 54.

With the above circuit structure in mind, the skilled artisan may now appreciate that the two-state devices 48, 54 can have two input impedance states, namely, matched and reflective. In the standby mode, the first two-state device 48 defaults to the matched state and the second two-state device 54 is in the reflected state. When the DC detect circuitry detects a DC value satisfying the threshold established by the reference voltage, the controller 34 toggles the states of the two-state devices 48, 54 to the opposite state, so that the electrical path between the main transmission line 42 and AC signal receiver 40 is closed. By selecting the appropriate matching circuits 46, 52 and lengths L1, L2 of the transmission lines 44, 50, respectively, the impedance in the reflective state of a two-state device can be established to approach an open circuit, while the impedance in the matched state of a two-state device can be established to approach an electrical short, at the frequency of intended operation (e.g., at 60 GHz).

While the particular SYSTEM AND METHOD FOR STANDBY MODE IN DIRECTIONAL SIGNAL RECEIVER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A wireless receiver configured to receive a directional signal, the receiver having a standby mode in which at least an oscillator of the receiver is deenergized and a DC detect circuit detecting an incoming directional AC signal and deriving a DC signal therefrom, the DC detect circuit causing at least the oscillator of the receiver to be energized responsive to a magnitude of the DC signal;

wherein the DC detect circuit includes at least one controller controlling at least one switch to selectively energize the oscillator;

wherein in the presence of an incoming directional signal producing a DC signal of sufficient magnitude, the controller causes the oscillator to be energized and the incoming directional signal to be sent thereto.

2. The receiver of claim 1, wherein the receiver is a 60GHz receiver.

3. The receiver of claim 1, wherein the DC detect circuit includes at least one rectifying element.

4. The receiver of claim 1, wherein the DC detect circuit includes at least one low pass filter.

5. The receiver of claim 1, wherein the DC detect circuit includes at least one comparator.

6. The receiver of claim 1, wherein the signal is in the 60 GHz band.

7. The receiver of claim 1, wherein the receiver is established by a transceiver.

* * * * *

UNITED STATES PATENT AND TRADEMARK OFFICE
CERTIFICATE OF CORRECTION

PATENT NO. : 7,596,367 B2  Page 1 of 1
APPLICATION NO. : 11/054468
DATED : September 29, 2009
INVENTOR(S) : Kenichi Kawasaki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1124 days.

Signed and Sealed this

Twenty-eighth Day of September, 2010

David J. Kappos
*Director of the United States Patent and Trademark Office*